US012752579B2

(12) United States Patent
Labrot-Rhodes et al.

(10) Patent No.: US 12,752,579 B2
(45) Date of Patent: Oct. 6, 2026

(54) METHOD FOR IMPROVING THE TRANSMISSION OF DATA BY A WHEEL UNIT

(71) Applicant: Continental Automotive Technologies GmbH, Hannover (DE)

(72) Inventors: Louis Labrot-Rhodes, Roques (FR); Jean-Christophe Bouthinon, Cugnaux (FR)

(73) Assignee: Continental Automotive Technologies GmbH, Hannover (DE)

(*) Notice: Subject to any disclaimer, the term of this patent is extended or adjusted under 35 U.S.C. 154(b) by 0 days.

(21) Appl. No.: 19/302,204

(22) Filed: Aug. 18, 2025

(65) Prior Publication Data

US 2026/0116129 A1 Apr. 30, 2026

(30) Foreign Application Priority Data

Oct. 30, 2024 (FR) ...................................... 2411850

(51) Int. Cl.
*B60C 23/04* (2006.01)
*H04B 17/318* (2015.01)

(52) U.S. Cl.
CPC ...... *B60C 23/0464* (2013.01); *B60C 23/0479* (2013.01); *H04B 17/318* (2015.01)

(58) Field of Classification Search
CPC ............ B60C 23/0464; B60C 23/0479; H04B 17/318
USPC ........................................................ 340/447
See application file for complete search history.

(56) References Cited

U.S. PATENT DOCUMENTS

| | | | | |
|---|---|---|---|---|
| 9,751,367 | B2 | 9/2017 | Kessler et al. | |
| 10,723,183 | B2 * | 7/2020 | Godet | B60C 23/0437 |
| 2013/0179113 | A1 | 7/2013 | Guinart | |
| 2018/0370300 | A1 | 12/2018 | Guinart et al. | |

FOREIGN PATENT DOCUMENTS

| | | | |
|---|---|---|---|
| FR | 3045499 | A1 | 6/2017 |
| WO | 2012045917 | A1 | 4/2012 |

OTHER PUBLICATIONS

Written Opinion on the Patentability of the Invention and Preliminary Research Report with machine translation mailed on Apr. 14, 2025 by the French Patent Office in corresponding French Patent Application No. FR2411850. (16 pages).

* cited by examiner

*Primary Examiner* — Eric Blount
(74) *Attorney, Agent, or Firm* — Buchanan Ingersoll & Rooney PC

(57) ABSTRACT

A method for managing messages transmitted via radio waves by a wheel unit to an external electronic unit, "clear zones", in which the signal can be transmitted without any alteration, and "blackspots", in which the signal risks being altered, are determined, and a specific transmission strategy that optimizes the number of messages in the clear zones is used.

11 Claims, 1 Drawing Sheet

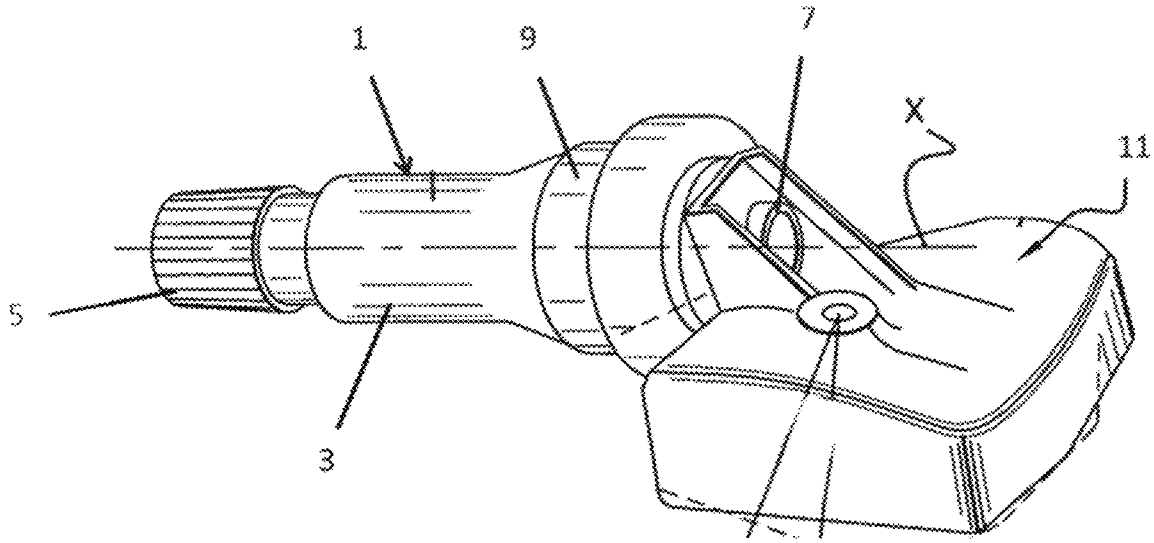
1
9
7
X
11
5
3

METHOD FOR IMPROVING THE TRANSMISSION OF DATA BY A WHEEL UNIT

CROSS REFERENCE TO RELATED APPLICATION

This application claims priority to French Application No. FR2411850, filed Oct. 30, 2024, the contents of such application being incorporated by reference herein.

FIELD OF THE INVENTION

The present invention relates to the field of electronic modules installed on the wheels of motor vehicles.

BACKGROUND OF THE INVENTION

As is known per se, the wheels of motor vehicles are frequently equipped with electronic modules, commonly referred to as a "wheel unit", forming part of a TPMS (Tire Pressure Monitoring System) type system, notably for monitoring the tire pressure.

Each wheel unit typically comprises various sensors, a microcontroller, a memory, a battery and means for communicating with the outside via radio waves.

The wheel unit can thus transmit useful information to an external electronic unit that represents, for example, the condition of the tire, the angular position of the wheel, etc.

The external electronic unit can be the ECU (Electronic Control Unit, that is, the on-board computer of the vehicle), or even any other type of electronic terminal such as a smartphone (multi-function mobile phone).

Radio wave communication between the wheel unit and the external electronic unit can be disrupted by the presence of metal or other masses located on board the vehicle: structural elements connecting the wheel to the vehicle, the presence of passengers and/or luggage inside the vehicle, etc., creating what is commonly referred to as "blackspots".

These disruptions can result in the messages transmitted by the wheel unit not being received and/or being truncated for certain angular positions of the wheel, and therefore being unable to be used by the external electronic unit.

SUMMARY OF THE INVENTION

An aspect of the present invention thus notably aims to reduce this risk of altering the messages transmitted by the wheel unit.

This aim of an aspect of the invention is achieved with a method for managing messages transmitted via radio waves by a wheel unit to an external electronic unit, characterized in that:

- the wheel unit transmits a signal at regular angular intervals of the wheel, and assigns an order number to each of these intervals;
- the external electronic unit detects whether or not this signal is received;
- the external electronic unit sends the wheel unit information representing this detection, or even stores this information;
- the wheel unit or the external electronic unit deduces the angular intervals therefrom, which are referred to as "clear zones", in which the signal can be transmitted without any alteration or with a slight alteration, and those, which are referred to as "blackspots", in which the signal risks being altered;
- the wheel unit or the external electronic unit extracts a series of indices of angular intervals of clear zones;
- the wheel unit or the external electronic unit computes the proportion for the arithmetic sequence with the most terms in said sequence, or whose terms correspond to angular intervals allowing the strength of the transmissions of said signal from the wheel unit to the external electronic unit to be optimized;
- the wheel unit transmits messages periodically, with the duration of the period being equal to the travel time of the wheel unit in each of said intervals, multiplied by said proportion.

By virtue of these features, the probability of the wheel unit transmitting its messages when it is in a clear zone is increased, thereby reducing the risks of altering its messages.

According to other optional features of an aspect of the present invention, taken alone or in combination:

- the wheel unit computes said period by means of the following formula:

$$p = r \cdot \frac{2\pi}{n} \cdot \sqrt{R/a}$$

where:

- p is the period for the wheel unit to transmit successive messages;
- r is the proportion for the arithmetic sequence with the most terms in the sequence of indices of the clear zones, for a given number of transmissions of messages;
- n is the total number of angular intervals; R is the radius of the circular path of the wheel unit; and
- a is the radial acceleration of the wheel unit;
  - the external electronic unit evaluates the reception strength of said signal, and sends information representing this strength to the wheel unit;
  - the proportion (r) that is selected is the proportion that allows the best score to be obtained of strengths transmitted by the wheel unit to the external electronic unit;
  - when the wheel unit transmits a signaling message ("broadcast advertisement"), it uses a prime number of regular angular intervals: this allows the wheel unit to transmit over different angular intervals from one wheel revolution to another, and therefore in particular avoids continued transmission in clear zones that have become blackspots due to, for example, the movement of masses inside the vehicle;
  - when the wheel unit establishes and maintains a connection with the external electronic unit, it uses a non-prime number of regular angular intervals: with such a number having multiple divisors, it can be obtained by multiple arithmetic sequences with different proportions. For example, if 48 regular angular intervals are selected, which is divisible by 2, 3, 4, 6, 8, 12, 16, 24, the wheel unit can perform 24 transmissions per revolution (2nd proportion arithmetic sequence) or 16 transmissions per revolution (3rd proportion arithmetic sequence) or 12 transmissions per revolution (4th proportion arithmetic sequence) or 8 transmissions per revolution (6th proportion arithmetic sequence) or 6 transmissions per revolution (8th proportion arithmetic sequence) or 4 transmissions per revolution (12th proportion arithmetic sequence), etc. Thus, the algorithm will be able to decide upon the best proportion, which a priori will be one of the integer divisors (if the connection is considered to be maintained "indefinitely"). More generally, the ideal scenario is to take a number with enough integer divisors;
- the wheel unit uses common angular intervals for transmitting signaling messages and transmitting connection messages;
- the wheel unit uses separate angular intervals for transmitting signaling messages and transmitting connection messages;
- the wheel unit adapts the strength of said signal as a function of the ratio of the number of clear zones to the number of blackspots: this allows only the required amount of electrical power to be consumed, and thus extends the service life of the battery of the wheel unit;
- the wheel unit resets the method if too many messages are altered or lost.

Optionally, when the wheel unit establishes and maintains a connection with the external electronic unit, provision also can be made for the method to restart subject to a request from the external electronic unit (detection of a change in passengers, mass, etc., in the vehicle by virtue of non-TPMS functions, notably such as the weight sensors on seats for fasten seatbelt warnings, etc., or other similar functions).

An aspect of the present invention also relates to a wheel unit comprising various sensors, a microcontroller, a memory, a battery and means for communicating with the outside via radio waves, with the microcontroller being duly programmed to implement the method described above.

BRIEF DESCRIPTION OF THE DRAWINGS

Further features and advantages of aspects of the present invention will become apparent in the light of the following description, and with reference to the appended FIGURE, which shows an assembly comprising a tire valve for a motor vehicle equipped with a wheel unit forming part of a TPMS type system.

DETAILED DESCRIPTION OF EXEMPLARY EMBODIMENTS

The FIGURE shows an inflation valve 1 for inflating a tire of a motor vehicle, with said valve comprising a body 3 covered by a closure cap 5.

The body 3 comprises a tubular metal part, the end 7 of which located opposite the cap is shown in the FIGURE, with this tubular metal part being coated with a flexible material such as synthetic rubber.

This flexible coating comprises a groove or shoulder 9 for retaining the valve inside an orifice formed in a wheel rim of a motor vehicle (not shown): this is referred to as a "snap-in" type valve.

The end 7 of the tubular metal part shown in the FIGURE is intended to emerge inside the chamber defined by the rim and the tire of the motor vehicle, so as to allow air to enter or exit into and out of this chamber.

A sensor assembly 11, commonly called "wheel unit", is attached to the valve 3, for example, at the end of the tubular metal part 7.

As is known per se, this wheel unit 11 comprises a sensor for detecting the pressure inside the chamber defined by the rim and the tire, as well as an accelerometer, a temperature sensor, a microcontroller, a memory, means for communicating with an external electronic unit, such as the ECU of a motor vehicle and/or a smartphone, and a battery for electrically powering the assembly.

Conventionally, communication with the ECU can occur over high frequencies (GHz and sub-GHz bands) in the wheel unit-to-ECU direction, and over low frequencies in the opposite direction.

More recently, this communication with the ECU, as well as with other external electronic units such as smartphones, can occur over Bluetooth® LE ("Low Energy").

In practice, this communication between the wheel unit and an external electronic unit is disrupted by the presence of blackspots, linked to the presence of metal masses (structure of the vehicle, and notably the wheel/chassis connection) or other masses (presence of passengers, luggage inside the vehicle, etc.) which form a shield against the circulation of radio waves.

In order to limit this risk of disruption and the consequent alteration of the messages transmitted by the wheel unit to the external electronic unit, the following strategy is implemented.

While the wheel is rotating, the wheel unit transmits signals to the external electronic unit (ECU or smartphone, for example) at regular time intervals.

Each of the angular positions of the wheel unit corresponding to these transmissions of signals can be known by virtue of the accelerometer integrated into this wheel unit, by virtue of a method of the localization by synchronized emission (LSE) type, as described, for example, in patent application WO 2012/045917 A1, incorporated herein by reference.

The external electronic unit checks whether or not it receives these signals, and/or analyzes the strength of each of them, and feeds back information to the wheel unit that represents this reception and/or this strength.

It is also possible to contemplate the wheel unit transmitting with progressive strength, and only the minimum strength that allowed detection by the external electronic unit being retained.

This information can be binary digital, of the 0 type if the strength received by the external electronic unit is less than a predetermined threshold, and 1 if this strength is greater than this threshold.

This information also can be analog, indicating the effective strength level of the signal received by the external electronic unit.

A relatively low strength level received by the external electronic unit indicates that the wheel unit is in a blackspot.

Conversely, a relatively high strength level indicates that the wheel unit is in a clear zone.

The strength of the signals used to carry out this mapping of the blackspots and the clear zones is optimized, so as to limit the electrical consumption of the wheel unit: for example, the strength to be used can be considered to be that which is just sufficient to obtain a ratio of the number of blackspots to the number of clear zones that is greater than a predetermined threshold.

The angular intervals scanned by the wheel unit between the transmissions of two consecutive signals are numbered by the wheel unit in the order in which they follow one another, as can be seen on the top row of Table 1 below: in this example, during a complete wheel revolution, eleven signals were transmitted by the wheel unit, and the wheel unit scanned eleven consecutive regular angular intervals, i.e., eleven sectors with the same angle.

TABLE 1

| 1 | 2 | 3 | 4 | 5 | 6 | 7 | 8 | 9 | 10 | 11 |
|---|---|---|---|---|---|---|---|---|---|---|
| 1 | 1 | 1 | 0 | 0 | 0 | 1 | 1 | 1 | 0 | 1 |

As can be seen on the bottom row of this table, the wheel unit associates the information representing the signal strength received by the external electronic unit with each of the numbers (indices) of the relevant angular intervals: in this example, the blackspots are therefore the angular intervals 4, 5, 6, 10, and the clear zones are the intervals 1, 2, 3, 7, 8, 9, 11.

The wheel unit then periodically transmits, i.e., at regular time intervals, the messages to be transmitted to the external electronic unit.

The value of this period is selected so as to be equal to the time taken by the wheel unit to cover each of the angular intervals defined above or, in other words, the time taken by the wheel to scan each of the angular sectors corresponding to these intervals.

Specifically, this inter-frame period separating the transmission (burst) of each message can be computed using the following formula:

$$p = r \cdot \frac{2\pi}{n} \cdot \sqrt{R/a}$$

where:

- p is the period for the wheel unit to transmit successive messages;
- r is the proportion for the arithmetic sequence with the most terms in the sequence of indices of the clear zones, for a given number of transmissions of messages;
- n is the total number of angular intervals;
- R is the radius of the circular path of the wheel unit; and
- a is the radial acceleration of the wheel unit.

For example, when the intention is for the wheel unit to transmit six messages with the sequence of indices {1, 2, 3, 7, 8, 9, 11, 12, 13, 14, 18, 19, 20, . . . }, the proportion r would be 5, with a transmission index of 9 for the first message, of 14 for the second message, of 19 for the third message, etc., allowing a 100% successful transmission to be achieved.

Alternatively, instead of using binary information of 0 or 1 type to characterize the blackspots and the clear zones, each angular interval could be associated with a data item representing the strength of the signal transmitted by the wheel unit to the external electronic unit.

In this case, the proportion r that is selected is the proportion that allows the best score to be obtained of strengths transmitted by the wheel unit to the external electronic unit.

Such a score can be made up of, for example, the sum of the strengths transmitted by the wheel unit in each angular interval, but any other method allowing these strengths to be taken into account (rather than binary information of 0 or 1 type as indicated above) may be suitable.

Selecting an inter-frame as indicated above maximizes the likelihood that the wheel unit is in a clear zone when it transmits its messages to the external electronic unit.

The selection of a prime number for the number of angular intervals (eleven in the above example) is particularly suitable when the wheel unit sends a one-way signaling message ("broadcast" mode).

Indeed, this allows the wheel unit to transmit over different angular intervals from one wheel revolution to another, and therefore avoids continued transmission in clear zones that have become blackspots due to, for example, the movement of masses inside the vehicle.

However, in the connection operating mode, i.e., with two-way communication between the wheel unit and the external electronic unit, it is preferable to use a number of angular intervals that is not a prime number, and is typically a multiple of 2 or 3, as shown in Table 2 below (twelve angular intervals in this particular case):

TABLE 2

| 1 | 2 | 3 | 4 | 5 | 6 | 7 | 8 | 9 | 10 | 11 | 12 |
|---|---|---|---|---|---|---|---|---|---|---|---|
| 1 | 1 | 0 | 0 | 0 | 1 | 1 | 1 | 0 | 0 | 1 | 1 |

If too many one-way signaling messages ("broadcast" mode) or exchanged two-way messages ("connection" mode) are altered or lost, the wheel unit can reset the method described above, and so restart establishing a map of the clear zones and blackspots.

Advantageously, and as shown in Table 3 below, a common map can be used for the "broadcast" and "connection" modes: in this example, twenty-two angular intervals (numbered from 1 to 22 on the top row of the table) are used for the two-way messages between the wheel unit and the external electronic unit ("connection" mode: clear zones and blackspots, respectively indicated by 0 and 1 in the middle row of the table), and eleven of these twenty-two angular intervals for the one-way signaling messages ("broadcast" mode: clear zones and blackspots, respectively indicated by 0 and 1 in the bottom row of the table).

In the particular example shown in Table 3 below, the following rule has been selected: the value of 1 is assigned to an angular interval for transmitting a signaling message when two consecutive intervals for transmitting connection messages themselves have the value of 1: such a rule is an example showing that a map does not need to be generated for each transmission mode.

TABLE 3

<table>
<tr><td>1</td><td>2</td><td>3</td><td>4</td><td>5</td><td>6</td><td>7</td><td>8</td><td>9</td><td>10</td><td>11</td><td>12</td><td>13</td><td>14</td><td>15</td><td>16</td><td>17</td><td>18</td><td>19</td><td>20</td><td>21</td><td>22</td></tr>
<tr><td>1</td><td>1</td><td>0</td><td>0</td><td>0</td><td>1</td><td>1</td><td>1</td><td>0</td><td>0</td><td>1</td><td>1</td><td>1</td><td>1</td><td>0</td><td>0</td><td>0</td><td>1</td><td>1</td><td>1</td><td>0</td><td>0</td></tr>
<tr><td colspan="2">1</td><td colspan="2">0</td><td colspan="2">0</td><td colspan="2">1</td><td colspan="2">0</td><td colspan="2">1</td><td colspan="2">1</td><td colspan="2">0</td><td colspan="2">0</td><td colspan="2">1</td><td colspan="2">0</td></tr>
</table>

Conversely, in the embodiment shown in Table 4 below, a map is generated for the "broadcast" mode (two top rows of the table), and another separate map is generated for the "connection" mode (two bottom rows of the table).

TABLE 4

| | | | | | | | | | | | |
|---|---|---|---|---|---|---|---|---|---|---|---|
| 1 | 2 | 3 | 4 | 5 | 6 | 7 | 8 | 9 | 10 | 11 | |
| 1 | 1 | 1 | 0 | 0 | 0 | 1 | 1 | 1 | 0 | 1 | |
| 1 | 2 | 3 | 4 | 5 | 6 | 7 | 8 | 9 | 10 | 11 | 12 |
| 1 | 1 | 0 | 0 | 0 | 1 | 1 | 1 | 0 | 0 | 1 | 1 |

In this embodiment, if one of the two maps changes (for example, as a result of a change in the distribution of the masses inside the vehicle), the other map can be reworked.

Preferably, the map of the "connection" mode will only be reworked if the map of the "broadcast" mode changes, because establishing the latter consumes significantly less electrical energy.

According to a possible variant, which is particularly advantageous in the "connection" mode, notably in order to avoid storage and computation on the wheel unit, it is also possible to contemplate the map being generated on the external electronic unit by virtue of the angular position information (the section index) that would be sent by the wheel unit.

In this variant, the map is generated on the external electronic unit that defines the inter-frame of the connection with the wheel unit.

In the "broadcast" mode, the external electronic unit could send the map back to the wheel unit after the mapping step (so that it can be autonomous thereafter).

Of course, the invention is described above by way of example. It should be understood that a person skilled in the art will be able to develop various alternative embodiments of the invention, yet without departing from the scope of the invention.

The invention claimed is:

1. A method for managing messages transmitted via radio waves by a wheel unit to an external electronic unit, the method comprising:

the wheel unit transmits a signal at regular angular intervals of the wheel, and assigns an order number to each of these intervals;

the external electronic unit detects whether or not the signal is received;

the external electronic unit sends a wheel unit information representing this detection, or even stores the wheel unit information;

the wheel unit or the external electronic unit deduces the angular intervals therefrom, which are referred to as "clear zones", in which the signal can be transmitted without any alteration or with a slight alteration, and those, which are referred to as "blackspots", in which the signal risks being altered;

the wheel unit or the external electronic unit extracts a series of indices of angular intervals of clear zones;

the wheel unit or the external electronic unit computes a proportion for an arithmetic sequence with the most terms in said sequence, or whose terms correspond to angular intervals allowing the strength of the transmissions of said signal from the wheel unit to the external electronic unit to be optimized;

the wheel unit transmits messages periodically, with the duration of the period being equal to a travel time of the wheel unit in each of said intervals, multiplied by said proportion.

2. The method as claimed in claim 1, wherein the wheel unit or the external electronic unit computes said period by means of the following formula:

$$p = r \cdot \frac{2\pi}{n} \cdot \sqrt{R/a}$$

where:

p is the period for the wheel unit to transmit successive messages;

r is the proportion for the arithmetic sequence with the most terms in the sequence of indices of the clear zones, for a given number of transmissions of messages;

n is the total number of angular intervals;

R is the radius of the circular path of the wheel unit; and a is the radial acceleration of the wheel unit.

3. The method as claimed in claim 1, wherein the external electronic unit evaluates the reception strength of said signal, and sends information representing this strength to the wheel unit.

4. The method as claimed in claim 3, wherein the proportion that is selected is the proportion that allows a best score to be obtained of strengths transmitted by the wheel unit to the external electronic unit.

5. The method as claimed in claim 1, wherein, when the wheel unit transmits a signaling message, it uses a prime number of regular angular intervals.

6. The method as claimed in claim 1, wherein, when the wheel unit establishes and maintains a connection with the external electronic unit, it uses a non-prime number of regular angular intervals.

7. The method as claimed in claim 1, wherein the wheel unit-uses common angular intervals for transmitting signaling messages and for transmitting connection messages.

8. The method as claimed in claim 1, wherein the wheel unit-uses distinct angular intervals for transmitting signaling messages and for transmitting connection messages.

9. The method as claimed in claim 1, wherein the wheel unit-adapts the strength of said signal as a function of the ratio of the number of clear zones to the number of blackspots.

10. The method as claimed in claim 1, wherein the wheel unit resets the method if a predetermined number of messages are altered or lost.

11. A wheel unit comprising various sensors, a microcontroller, a memory, a battery and means for communicating with the outside via radio waves, with the microcontroller being duly programmed to implement a method for managing messages transmitted via radio waves by a wheel unit to an external electronic unit, the method comprising:

the wheel unit transmits a signal at regular angular intervals of the wheel, and assigns an order number to each of these intervals;

the external electronic unit detects whether or not the signal is received;

the external electronic unit sends a wheel unit information representing this detection, or even stores the wheel unit information;

the wheel unit or the external electronic unit deduces the angular intervals therefrom, which are referred to as "clear zones", in which the signal can be transmitted without any alteration or with a slight alteration, and those, which are referred to as "blackspots", in which the signal risks being altered;

the wheel unit or the external electronic unit extracts a series of indices of angular intervals of clear zones;

the wheel unit or the external electronic unit computes a proportion for an arithmetic sequence with the most terms in said sequence, or whose terms correspond to angular intervals allowing the strength of the transmissions of said signal from the wheel unit to the external electronic unit to be optimized;

the wheel unit transmits messages periodically, with the duration of the period being equal to a travel time of the wheel unit in each of said intervals, multiplied by said proportion.

* * * * *